United States Patent [19]

Fu et al.

[11] Patent Number: 5,007,771
[45] Date of Patent: Apr. 16, 1991

[54] METHOD FOR TREATING CONTAMINATED SOIL BY BIOLOGICAL DEGRADATION ON A SLOPED SURFACE

[75] Inventors: Jaw K. Fu, Pittsburgh; Arch J. Merritt, deceased, late of Pittsburgh, by Helene Merritt, executrix; John R. Smith, Pittsburgh, all of Pa.

[73] Assignee: Keystone Environmental Resources, Inc., Monroeville, Pa.

[21] Appl. No.: 485,228

[22] Filed: Feb. 26, 1990

Related U.S. Application Data

[63] Continuation of Ser. No. 150,536, Feb. 1, 1988, abandoned.

[51] Int. Cl.⁵ .............................................. E02D 3/00
[52] U.S. Cl. .................................... 405/258; 405/128
[58] Field of Search ................. 405/36, 128, 129, 258, 405/263; 210/170, 747

[56] References Cited

U.S. PATENT DOCUMENTS

| | | | |
|---|---|---|---|
| 4,462,713 | 7/1984 | Zurcher et al. | 405/36 |
| 4,541,752 | 9/1985 | Phillips | 405/129 |
| 4,611,950 | 9/1986 | Russomano | 405/128 |
| 4,696,599 | 9/1987 | Rakoczynski | 405/129 |

OTHER PUBLICATIONS

U.S. Department of Agriculture Publication "Urban Hydrology for Small Watersheds"-Technical Release 55-Jun., 1986, pp. 2-1 through 2-16.

*Primary Examiner*—David H. Corbin
*Attorney, Agent, or Firm*—Ingersoll Buchanah

[57] ABSTRACT

A method is disclosed in which the shape is selected and the soil composition is adjusted on a sloped treatment cell so that downward migration of moisture during the treatment of contaminated soil is minimized. The need to use a plastic liner is thus avoided.

10 Claims, 1 Drawing Sheet

METHOD FOR TREATING CONTAMINATED SOIL BY BIOLOGICAL DEGRADATION ON A SLOPED SURFACE

This application is a continuation of application Ser. No. 150,536, filed Feb. 1, 1988, now abandoned.

BACKGROUND OF THE INVENTION

1. Field of the Invention

The present invention relates to the elimination of contaminants from soils and, in particular, to the elimination of organic compounds by biological degradation.

2. Brief Description of the Prior Art

It is known in the art that soils contaminated with various organic compounds can be treated with certain "land farming" techniques to eliminate the contaminants by biological degradation. That is, the soil to be treated is layered over a base surface and the growth of microorganisms capable of degrading the contaminants is encouraged in the soil by providing favorable moisture, nutritional and aeration conditions.

Precipitation may result in excess moisture which may tend to form in ponds on the surface of the soil layer. Excess moisture may also migrate vertically downwardly toward the water table and thereby spread contaminants with it. Depending on the amount of local precipitation and the particular characteristics of the soil being treated, it is, therefore, often necessary to provide a plastic liner beneath the soil being treated to prevent such downward migration of moisture.

SUMMARY OF THE INVENTION

In the present invention contaminated soil to be treated is arranged in a sloped surface. The shape of the treatment cell and the steepness of the slope are selected so that downward migration of water from the contaminated soil is minimized. The slope, however, is not so great that the treatment cell will be significantly eroded. Soil additives may also be used to help achieve a condition in which downward migration of water is minimized.

BRIEF DESCRIPTION OF THE DRAWINGS

The invention is further described with reference to the accompanying drawings in which.

DETAILED DESCRIPTION

Figure 1:
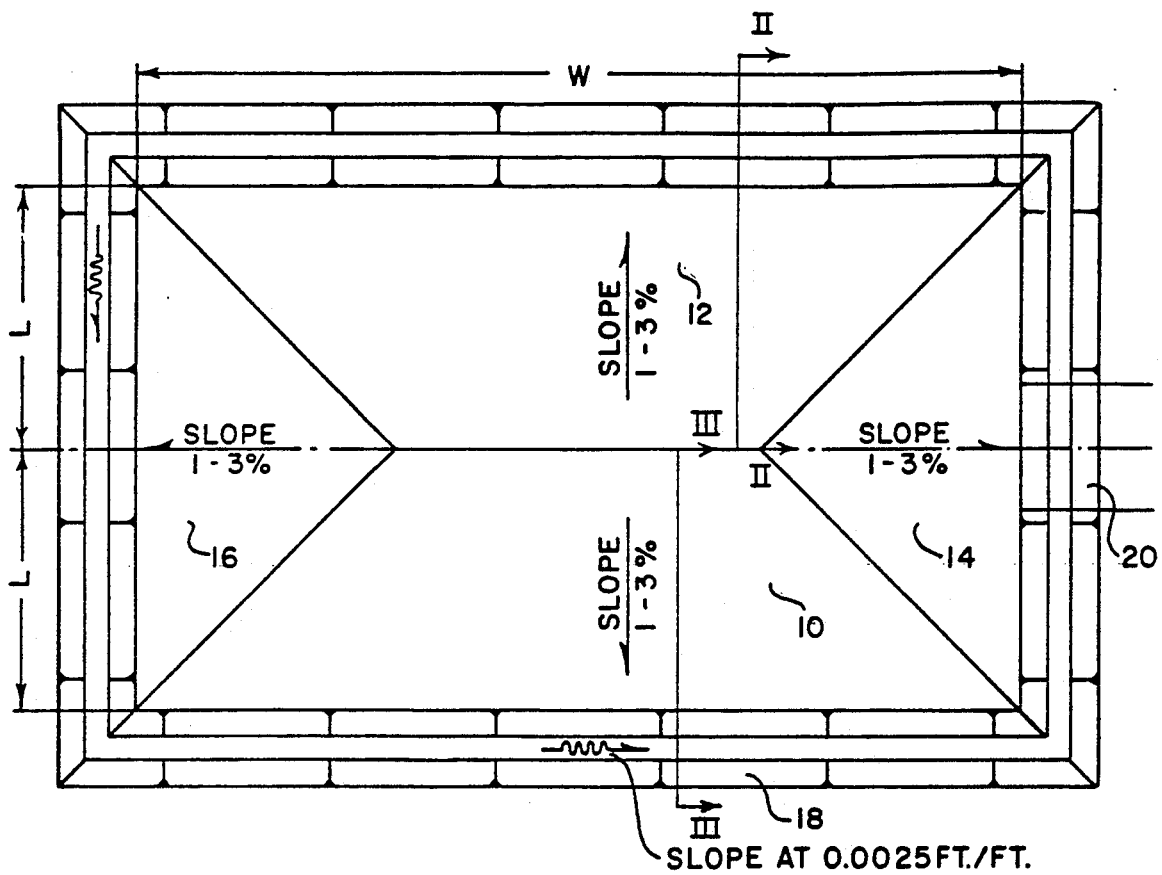
FIG. 1 is a plan view of a soil treatment bed in which a preferred embodiment of the method of the present invention may be practiced.
Figure 2:
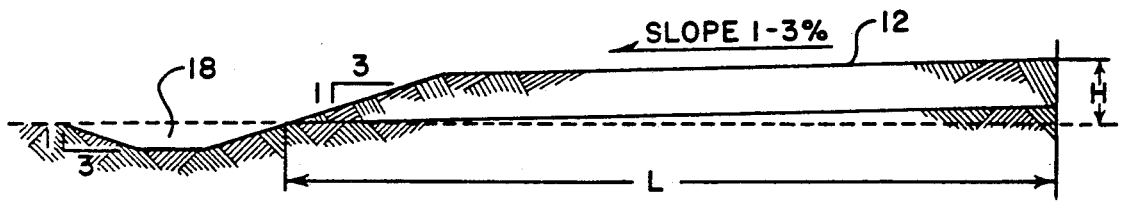
FIG. 2 is a cross sectional view of the soil treatment bed shown in FIG. 1 taken through line II—II in FIG. 1.
Figure 3:
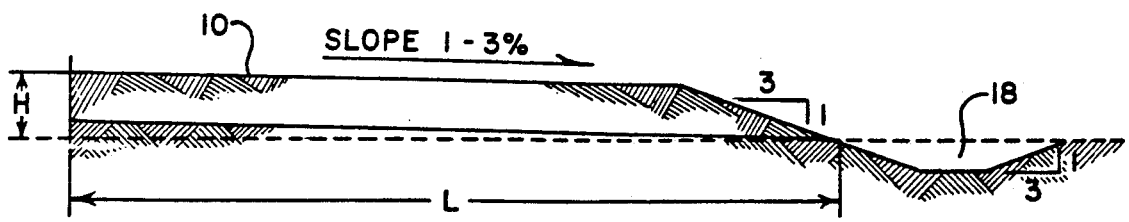
FIG. 3 is a cross sectional view of the soil treatment bed shown in FIG. 1 taken through line III—III in FIG. 1.

Referring to FIGS. 1 to 3, contaminated soil to be treated is arranged in a sloped structure for treating such soil which is referred to herein as a "treatment bed". As will be discussed hereafter a length in direction of flow, L, and a width, W, may be selected to help optimize conditions for treating the soil. It will be observed that length in direction of flow, L, is the distance from the highest point in the treatment bed to a side trench. It would also have a height, H, selected for the same reason, and it would have a downward slope of 1–3%. The upper limit of 3% is selected to minimize erosion. The treatment bed has two sloped sides 10 and 12 and two sloped ends 14 and 16. Around the edge of the treatment bed there is a trench 18, and adjacent the trench the treatment bed slopes more steeply, at about a 1 foot vertical drop per 3 lateral feet. The sloped treatment bed may be entirely formed from the contaminated soil to be treated, or the contaminated soil may be positioned in a layer of generally uniform thickness on a sloped base surface that is equally or less water permeable than the contamined soil. The trench serves to intercept, collect and channel water to a central point. The trench will preferably have a gradual slope of about 0.0025 ft./ft. so that run off water can be collected from the trench at the central collection point. There is also an access ramp 20 across the trench. The water thus collected can be discharged under permit or collected in a tank or lined pond for recycling. This water diversion and collection system should be designed to accommodate between a 10 to 25 year frequency storm. Moisture and nutrients will be provided to encourage growth in the treatment bed of microorganisms capable of degrading the organic compound contaminants. The treatment bed will also be tilled to provide aeration to encourage growth of such microorganisms. Mechanically changing the land surface of the treatment bed to drain surface runoff may be accomplished by smoothing or leveling. Land grading for drainage consists of shaping the land surface by cutting, filling and smoothing to planned continuous grades. The purpose of establishing continuous grades is to ensure that runoff does not pond and thus infiltrate into the treatment bed. The U. S. Department of Agriculture published SCS *National Engineering Handbook* (1971) may be used in conjunction with state standard specifications as a guide in land grading.

In the method of the present invention the dimensions of the above described treatment bed are selected and the soil type adjusted so that nearly all precipitation will run off the treatment bed. Slope is kept in a low enough range (1–3 percent) so that undue erosion of the treatment bed does not occur. Because nearly all precipitation runs off the treatment bed, little if any water migrates downwardly toward the water table.

The amount of rainfall that runs off the treatment cell is influenced by precipitation, antecedent moisture condition, soil hydrologic condition and topography and shape in the manner discussed below.

Precipitation

Precipitation generally occurs as rain or snow, potentially to the subsurface to combine with groundwater flow or it may run off the surface of the treatment bed. The soil type has a major effect on the amount of precipitation that runs off. Mechanical treatment of the treatment bed along with the topography and the shape, affect the rate at which water runs off. The highest rates of runoff from small treatment beds are usually caused by intense rainfall. The intensity of rainfall affects the rate of run off. The melting of accumulated snow in the mountain or northern plains may result in greater volume of run off, out usually at a lesser rate caused by rainfall. Three typical 24-hour storm distributions, type IA, Type I, and Type II were developed from U.S. National Oceanic and Atmospheric Administration data. Type IA and I storm distribution is characteristic of the coastal side of the western United States. The Type II storm distribution is typical of more intense storms occurring over the remainder of the U.S. continent, Puerto Rico and Virgin Islands. Data on the depth, aerial distribution, and water content of the snow on small watersheds are rarely available. Sometimes transposition of data from another area is very likely to lead to erroneous estimates, since local topography and ground cover will greatly affect the drifting and distribution of snow. Probability analysis and prediction are often used when precipitation is in the form of snow.

Antecedent Moisture Condition

The amount of precipitation occurring of the five days preceding a storm in interest is an indication of the antecedent moisture condition of the soil. The average is considered as between 1.4 and 2.1 inches during the treatment period.

Hydrologic Soil Groups

In the U.S. Department of Agriculture, Soil Conservation Service Technical Release 521 entitled "Procedure for Computing Sheet and Drill Erosion Project Areas" (1977), over 8,000 soils are classified into four hydrologic soil groups. These hydrologic groups, according to their infiltration and transmission rate, are:

A. Soil having high infiltration rates even when it is thoroughly wetted. These soils have a high rate of transmission in that water readily passes through them.
B. Soil having moderate infiltration rates when thoroughly wetted. These soils have a moderate rate of water transmission.
C. Soil having slow infiltration rates when it is thoroughly wetted. These soils have a slow rate of water transmission.
D. Soil having very slow infiltration rates when it is thoroughly wetted. These soils have a very slow rate of water transmission.

Hydrologic Conditions

The soil and its hydrologic condition affect the volume of infiltration and run off in the treatment cell. The hydrologic condition of the soil is determined by its moisture content at the time of the storm, its humus and organic content and its temperature, and whether or not it is frozen.

Topography amd Shape

The topography and the shape of the treatment cell have a major effect on infiltraton and run off. The shape of the treatment cell is defined herein in terms of a shape index, $S_w$, in which:

$$S_w = L/W = L^2/A$$

where L is the length of the treatment cell from the highest point to the trench, W is the average width of the treatment cell, and A is the area of the treatment cell. An increase in the shape index causes a reduction of the peak discharge rate due to the longer time-of-concentration, and vice-versa. Therefore in a particular area which is exceptionally long and narrow, greater infiltration would be expected. Conversely, a treatment bed which has a minimum length would reduce the infiltration. A treatment bed with a lesser length would have a lesser time of concentration and thus less time for infiltration to occur. The average slope can be defined as the ratio of the difference in elevation between the treatment cell discharge point and the highest point to the approximate average length of the treatment cell.

Time of Concentration t takes for water to
Time of concentration is the time it takes for water to travel from the most distant point of a watershed to the discharge point of the watershed. The time of concentration can be calculated assuming an average Manning's n (roughness coefficient) and hydraulic radius. The formula for determining time of concentration is:

$$T_c = L^{1.15}/7700 \, H^{0.38}$$

where $T_c$ is the estimated time of concentration, L is the length of the treatment bed in the direction of flow from the highest point to the discharge point, and H is the elevation difference between these two points. The combined effect of soil, hydrologic condition, precipitation, topography and shape, and antecedent moisture condition on the amount of rainfall that runs off the treatment cell can be represented by the run off curve numbers (CN). The CN can be expressed as:

$$CN = 1000/(S + 10)$$

where S is the potential infiltration, and run off (Q) can be calculated as follows:

$$Q = (P - 0.2S)^2/(P + 9.8S)$$

A detailed description on estimation of the peak flow rate is presented in the U.S. Department of Agriculture, Soil Conservation Service, Technical Release 55 of June, 1986 entitled "Urban Hydrology for Small Watersheds", the contents of which are incorporated herein by reference.

Those skilled in the art will, in view of the above, appreciate that it will be possible to select the shape of the treatment cell and/or adjust soil composition so that run off is approximately equal to precipitation. Under such conditions there will be little, if any, downward migration of moisture. Such selection of shape and adjustment of soil tpe is illustrated in the following example.

EXAMPLE

A treatment cell similar to the one shown in FIGS. 1-3 is constructed. Length in direction of flow (L) is 100 ft., width (W) is 350 ft., and Height (H) is 2 feet. Time of concentration (Tc) is thus calculated as follows.

$$Tc = L^{1.15}/7700 \, H^{0.38}$$

$$Tc = 199.53/10,020$$

$$Tc = 0.0199 \text{ hrs.} = 2.19 \text{ min.}$$

The soil in the treatment cell is soil Type D. From pages 2-6 of the above mentioned Technical Release 55 the curve number (CN) for a newly graded area with no vegetation is 94. The potential maximum retention after run off (S) is calculated as follows.

$$S = \frac{1000}{CN} - 10 = \frac{1000}{94} - 10 = 0.638$$

For a design storm of 10 inches (25 year, 24 hour storm), precipitation (P) is 10 inches and run off (Q) is calculated as follows:

$$Q = \frac{(P - 0.25)}{(P + 0.85)} = \frac{[10 - 0.2(0.638)]^2}{[10 + (0.8)(0.638)]} = 9.3$$

Thus out of 10 inches of precipitation 9.3 inches runs off and only 0.7 inches infiltrates so that approximately 93 percent runs off. By controlling the type of soil additive to give a curve number (CN) of 94, infiltration is thus limited.

It will be appreciated that a method for treating contaminated soil is described in which downward migration of moisture can be avoided without use of a plastic liner. Although the invention has been described with a certain degree of particularity, it is to be understood that the present disclosure has been made only as an example and that the scope of the invention is defined by what is hereafter claimed.

What is claimed is:

1. A method for treating organically contaminated soil comprising the steps of arranging said contaminated soil in a treatment bed sloping from its interior toward one or more of its edges and having a collecting trench around said edges, applying nutrients to the soil to encourage growth therein of micro-organisms capable of degrading the organic compound contaminants and applying water to said treatment bed on its surface and concurrently withdrawing water through said collecting trench; the shape of the treatment bed and the steepness of its slope being selected to minimize both vertically downward migration of water and water erosion of the shaped treatment bed.

2. The method for treating contaminated soil recited in claim 1 wherein the composition of the contaminated soil is also adjusted to minimize vertically downward migration of water and water erosion of the sloped surface.

3. The method for treating contaminated soil recited in claim 1 wherein the composition of the contaminated soil is adjusted and the steepness of the slope of the treatment bed is selected to minimize both vertically downward migration of water and water erosion of the sloped treatment bed.

4. The method for treating contaminated soil recited in claim 1, 2 or 3 wherein the contaminated soil is positioned in a layer of generally uniform thickness on a sloped base surface comprised of a material that is less water permeable than the contaminated soil.

5. The method for treating contaminated soil recited in claims 1, 2 or 3 wherein water is allowed to run off the treatment bed and is collected and reapplied to the treatment bed.

6. The method for treating contaminated soil recited in claims 1, 2 or 3 wherein the slope of the treatment bed is from about 1 percent to about 3 percent.

7. The method for treating contaminated soil recited in claims 1, 2 or 3 wherein the treatment bed is conditioned by aeration and addition of nutrients.

8. A method for treating organically contaminated soil comprising the steps of arranging said contaminated soil in a treatment bed sloping downwardly from its interior toward one or more of its edges and having a collecting trench around said edges, applying nutrients to the soil to encourage growth therein of microorganisms capable of degrading the organic compound contaminants, applying water to said treatment bed on its surface, withdrawing water through said collecting trench, and selecting the shape of said treatment bed so that said water which runs off the surface of said treatment bed is approximately equal in volume to said water which is applied to said treatment bed.

9. A method for treating organically contaminated soil comprising the steps of arranging said contaminated soil in a treatment bed sloping downwardly from its interior toward one or more of its edges and having a collecting trench around said edges, applying nutrients to the soil to encourage growth therein of microorganisms capable of degrading the organic compound contaminants, applying water to said treatment bed on its surface, withdrawing water through said collecting trench, and selecting the slope of the said treatment bed to limit downward migration of water such that the slope is at least one degree but less than three degrees.

10. A method for treating organically contaminated soil comprising the steps of arranging said contaminated soil in a treatment bed sloping downwardly from its interior toward one or more of its edges and having a collecting trench around said edges, applying nutrients to the soil to encourage growth therein of microorganisms capable of degrading the organic compound contaminants, applying water to said treatment bed on its surface, withdrawing water through said collecting trench, and adjusting the composition of said contaminated soil so that said water which runs off the surface of said treatment bed is approximately equal in volume to said water which is applied to said treatment bed.

* * * * *

UNITED STATES PATENT AND TRADEMARK OFFICE
CERTIFICATE OF CORRECTION

PATENT NO. : 5,007,771
DATED : April 16, 1991
INVENTOR(S) : JAW K. FU, ARCH MERRITT, JOHN R. SMITH It is certified that error appears in the above-identified patent and that said Letters Patent is hereby corrected as shown below:

ON TITLE PAGE:
At Attorney, Agent or Firm, change "Ingersoll Buchanah" to --Buchanan Ingersoll--.

Column 2, line 51, after "potentially" insert --penetrates--.

Column 2, line 61, change "out" to --but--.

Column 3, line 11, change the second occurrence of "of" to--in--.

Column 3, line 46, change "amd" to --and--.

Column 4, line 3, delete "t takes for water to"

Column 4, line 42, change "tpe" to --type--.

Column 5, line 1 in the equation change "(P-0.25) to --(P-0.25)$^2$--.

Signed and Sealed this

Tenth Day of November, 1992

Attest:

DOUGLAS B. COMER

Attesting Officer     Acting Commissioner of Patents and Trademarks